United States Patent [19]

Bybee

[11] Patent Number: 5,333,112
[45] Date of Patent: Jul. 26, 1994

[54] AUTOMATIC FLOW GRIND SYSTEM AND METHOD

[75] Inventor: Jimmy L. Bybee, Mission Viejo, Calif.

[73] Assignee: AAI/ACL Technologies, Inc., Santa Ana, Calif.

[21] Appl. No.: 37,032

[22] Filed: Mar. 25, 1993

[51] Int. Cl.⁵ .................... G06F 15/46; B24B 49/00
[52] U.S. Cl. ................ 364/474.06; 364/550; 51/165.71
[58] Field of Search .......... 364/474.06, 474.11, 364/474.17, 509, 510, 550; 51/165.71, 165.74

[56] References Cited

U.S. PATENT DOCUMENTS

| | | |
|---|---|---|
| 2,934,938 | 5/1960 | Rhoades . |
| 3,976,864 | 8/1976 | Gordon et al. . |
| 4,274,438 | 6/1981 | La Coste . |
| 4,337,638 | 7/1982 | Leonard et al. . |
| 4,404,639 | 9/1983 | McGuire et al. . |
| 4,418,392 | 11/1983 | Hata . |
| 4,484,329 | 11/1984 | Slamka et al. . |
| 4,494,212 | 1/1985 | Muellner . |
| 4,556,956 | 12/1985 | Dickenson et al. . |
| 4,573,114 | 2/1986 | Ferguson et al. . |
| 4,627,267 | 12/1986 | Cohrs et al. . |
| 4,633,422 | 12/1986 | Brauer . |
| 4,642,636 | 2/1987 | Smith et al. . |
| 4,658,634 | 4/1987 | Killough et al. . |
| 4,740,902 | 4/1988 | Yoneda et al. ............ 364/474.06 |
| 4,858,103 | 8/1989 | Takeuchi et al. . |
| 4,912,468 | 3/1990 | Rust . |
| 4,916,641 | 4/1990 | Bybee ........................ 364/550 |
| 4,980,825 | 12/1990 | Tootell et al. ............ 364/510 |
| 5,235,525 | 8/1993 | Bybee ........................ 364/550 |

OTHER PUBLICATIONS

*Industrial Measurements & Controls Operations Manual for Servoactuator Test System,* P/N 11850, Document No. 100050, dated Dec. 16, 1980.

*Industrial Measurement & Controls Calibration Procedure for Servoactuator Test System,* P/N 11850, Document No. 100051, dated Mar. 3, 1981.

Primary Examiner—Jerry Smith
Assistant Examiner—Steven R. Garland
Attorney, Agent, or Firm—Merchant, Gould, Smith, Edell, Welter & Schmidt

[57] ABSTRACT

A system for the measurement of servo-valve "spool and sleeve sets" using automatic flow and pressure gain, plus displacement measurements. The system precisely grinds spool land edges so as to exactly match these edges with the sleeve slots or holes in order to meet the required overlap/underlap and performance requirements of the servo-valve. All operations are controlled by a computer in accordance with servo-valve performance parameters that are held in memory corresponding to the "spool and sleeve set" part number.

14 Claims, 18 Drawing Sheets

AAI/ACL TECHNOLOGIES, INC.   IMAGE

PAGE 2 OF 3: UUT DEFINITION

UUT NAME: SAMPLE SPOOL          GRIND SPINDLE RATE: 2000 RPM

| EDGE | MEASURE LAND OR GAP | ROTATE TO GRIND EDGE |
|---|---|---|
| 1 | LAND | NO |
| 2 | LAND | NO |
| 3 | LAND | NO |
| 4 | LAND | NO |
| 5 | LAND | NO |
| 6 | LAND | NO |

TYPE IN NEW VALUE, PRESS ENTER
GRINDING STOPPED

FLOW: ON-LINE                                               CNC: READY

FIG. 5

AAI/ACL TECHNOLOGIES, INC.    IMAGE

PAGE 3 OF 3: UUT DEFINITION

UUT NAME: _____     GRINDING FEEDRATES

| AMOUNT TO BE REMOVED | INITIAL | INTERMEDIATE | FINAL |
|---|---|---|---|
| LESS THAN 0.000050 IN | 0.00000 IPM | 0.00000 IPM | 0.00000 IPM |
| LESS THAN 0.000100 IN | 0.00000 IPM | 0.00000 IPM | 0.00000 IPM |
| LESS THAN 0.000500 IN | 0.00000 IPM | 0.00000 IPM | 0.00000 IPM |
| LESS THAN 0.001000 IN | 0.00000 IPM | 0.00000 IPM | 0.00000 IPM |
| LESS THAN 0.005000 IN | 0.00000 IPM | 0.00000 IPM | 0.00000 IPM |
| GREATER THAN 0.005000 IN | 0.00000 IPM | 0.00000 IPM | 0.00000 IPM |

TYPE IN NEW VALUE, PRESS ENTER
GRINDING STOPPED

FLOW: ON-LINE                          CNC: READY

FIG. 6

AAI/ACL TECHNOLOGIES, INC.   IMAGE

RUN: GRINDING WHEEL DRESSING CYCLE

GRINDING WHEEL ID: 320 DIAMOND

==============================STATISTICS==============================

DATE & TIME INSTALLED .......... 09/19/90   08:35:15

DATE & TIME LAST DRESSED .... 10/03/90   14:02:41

NUMBER OF TIMES DRESSED ...... 3

| USAGE ..... | SINCE DRESSED | SINCE INSTALLED |
|---|---|---|
| VOLUME GROUND | 1.206471 CI | 3.006242 CI |
| UUTs GROUND | 14 | 37 |
| EDGES GROUND | 35 | 73 |

TYPE IN NEW VALUE, PRESS RETURN
GRINDING STOPPED

FLOW: ON-LINE                                              CNC: ON-LINE

FIG. 8

AUTOMATIC FLOW GRIND SYSTEM AND METHOD

BACKGROUND OF THE INVENTION

1. Field of the Invention

This invention relates generally to computer controlled machining systems and methods, and more particularly, to a system and method for precise machining of servo-valve components and the like.

2. Description of Related Art

Servo-valves are widely used in industrial processes and machine systems, because they enable a great deal of power or large forces to be exerted in response to low level electrical signals. In the present state of the art, however, extremely high precision is required, and this in turn demands that precise information be gained as to the performance of the servo-valve under a great many different static and dynamic conditions. Servo-valve analyzers have been developed which allow the measurement of a number of parameters of a unit under test (UUT). During the manufacturing process, when a servo-valve does not perform as required, the spool portion of the so-called spool and sleeve set of the servo-valve is machined to achieve a more precise alignment with the sleeve. The precise machining process of the spool to match the sleeve is referred to as "flow grinding."

Manual or semi-automatic flow grinding processes entail laborious trial and error techniques. The process steps include first testing the servo-valve by placing it in a fixture, exercising it, and recording its' response data. From the test data, a machinist must determine what type of machining is required to improve servo-valve performance. The servo-valve is then removed from the test jig, disassembled, machined, reassembled, and retested. This cycle is repeated until the servo-valve meets the performance requirements, or until further machining would be fruitless. A major limitation of prior art flow grind systems is that a skilled machinist must manually determine the parameters for the performance tests and the machining processes.

Thus, there is a need in the art for an automated flow grind system which would eliminate the trial and error approach, and would complement an automated servo-valve analyzer system.

SUMMARY OF THE INVENTION

To overcome the limitations in the prior art described above, and to overcome other limitations that will become apparent upon reading and understanding the present specification, the present invention discloses a system for the measurement of servo-valve "spool and sleeve sets" using automatic flow, pressure, and displacement measurements in order to determine such performance characteristics as flow and pressure gain. The system precisely grinds spool land edges so as to exactly match these edges with the sleeve slots or holes in order to meet the required overlap/underlap and other performance requirements of the servo-valve. All operations are controlled by a computer in accordance with servo-valve performance parameters that are held in memory corresponding to the "spool and sleeve set" part number.

BRIEF DESCRIPTION OF THE DRAWINGS

Referring now to the drawings in which like reference numerals and letters indicate corresponding elements throughout the several views:

FIG. 5 depicts a second UUT definition screen;

FIG. 6 depicts a third UUT definition screen;

FIG. 8 depicts an automatic dressing cycle screen;

DETAILED DESCRIPTION OF THE PREFERRED EMBODIMENT

In the following description of the preferred embodiment, reference is made to the accompanying drawings and which form a part hereof and which is shown by way of illustration a specific embodiment in which the invention may be practiced. It is to be understood that other embodiments may be utilized and structural changes may be made without departing from the scope of the present invention.

GENERAL OVERVIEW

The present invention provides a system for the measurement of servo-valve "spool and sleeve sets" using automatic flow, pressure, and displacement measurements for the purpose of determining such performance characteristics as flow and pressure gain. The present invention also provides a system for precisely grinding spool land edges so as to exactly match these edges with the sleeve slots or holes in order to meet the required overlap/underlap and other performance requirements of the servo-valve. All operations are controlled by a computer in accordance with servo-valve performance parameters that are held in memory corresponding to the "spool and sleeve set" part number.

The present invention provides an automatic flow grind system that is part number driven, i.e., the entry of a part number or model number for a spool/sleeve assembly causes all the unique intelligence for that part to be made available for use by the system. New spool/-sleeve definitions can be added without the use of any special programming skills or equipment, and the maintenance or modification of definitions can also be performed easily.

EQUIPMENT CONFIGURATION

Figure 1:
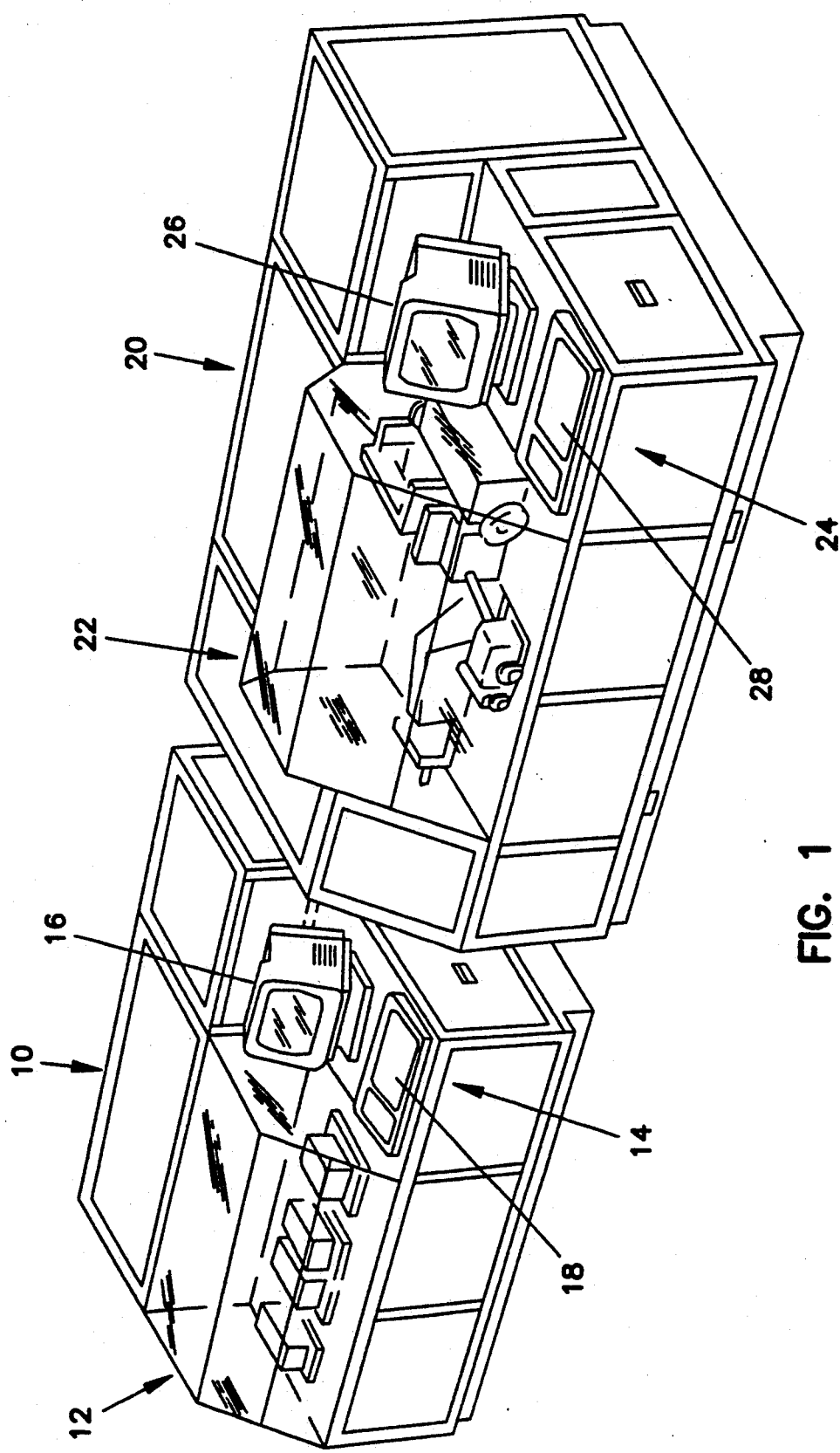
FIG. 1 depicts a plan view of the preferred embodiment of the present invention.

FIG. 1 depicts a plan view of the preferred embodiment of the present invention. A measurement console 10 hydraulically measures the relationship between the metering edges of a spool and the slots in a mating sleeve. The measurement console 10 includes a measurement area 12 having such well-known components as a transducer system that is connected to control and sense characteristics of a unit under test (UUT), and a transducer interface system connecting the transducer system. The console 10 operates under the control of a computer 14 (hidden behind a panel), which includes a monitor 16 and a keyboard 18. Preferably, the measurement console 10 may comprise a servo-valve analyzer system, such as the one described in U.S. Pat. No. 4,916,641 issued Apr. 10, 1990 to J. L. Bybee, assigned to the assignee of the present invention, and incorporated by reference herein.

The servo-valve spool and sleeve sets are placed in a flow-gain fixture in the measurement area 12 and clamped into position. The model number and serial number of the assembly are entered into the measurement console 10, and the "run" button is then pressed. The measurement console 10 tests the spool and sleeve set by applying hydraulic flow and pressure as the spool is being controlled by a linear actuator. Flows and pressures are accurately measured and recorded by the computer 14. The spool and sleeve set are automatically cycled through a multiple-land flow-gain and edge removal calculation, wherein the results of the calculation are stored in the computer 14. The calculations determine how much material must be ground from each metering edge to produce the desired mechanical synchronization for the servo-valve. This data is transmitted to a grind console 20 by a data communications link (not shown) for use in controlling the grinding of the spool edges. If the leakage and gain values are acceptable, the spool-sleeve assembly may be removed for immediate grinding or placed in a queue for that process at a later date.

The grind console 20 uses the calculated information from the measurement console 10 and grinds the metering edges of the spool. The grind console 20 is a complete programmable machine tool that grind spools to an accuracy of 50 millionths of an inch. The grind console 20 includes a grinding area 22 having such well-known components as a two-axis compound slide for positioning and feeding a grind spindle, a headstock and a tailstock for mounting a spool of a servo-valve, a grinding wheel, and a contact gaging system. The grind console 20 operates under the control of a computer 24 (hidden behind a panel), which includes a monitor 26 and a keyboard 28.

When grinding is to occur, the spool is placed in a grinding fixture in the grinding area 22, the model number and serial number entered, and the "run" key is pressed on the keyboard 28. The grind console 20 proceeds to each edge in sequence and removes the prescribed amount of material according to the previous calculations performed by the measurement console 10. When grinding and deburring are complete, the spool may be removed and returned to the manufacturing process, along with its matching sleeve.

Figure 2A:
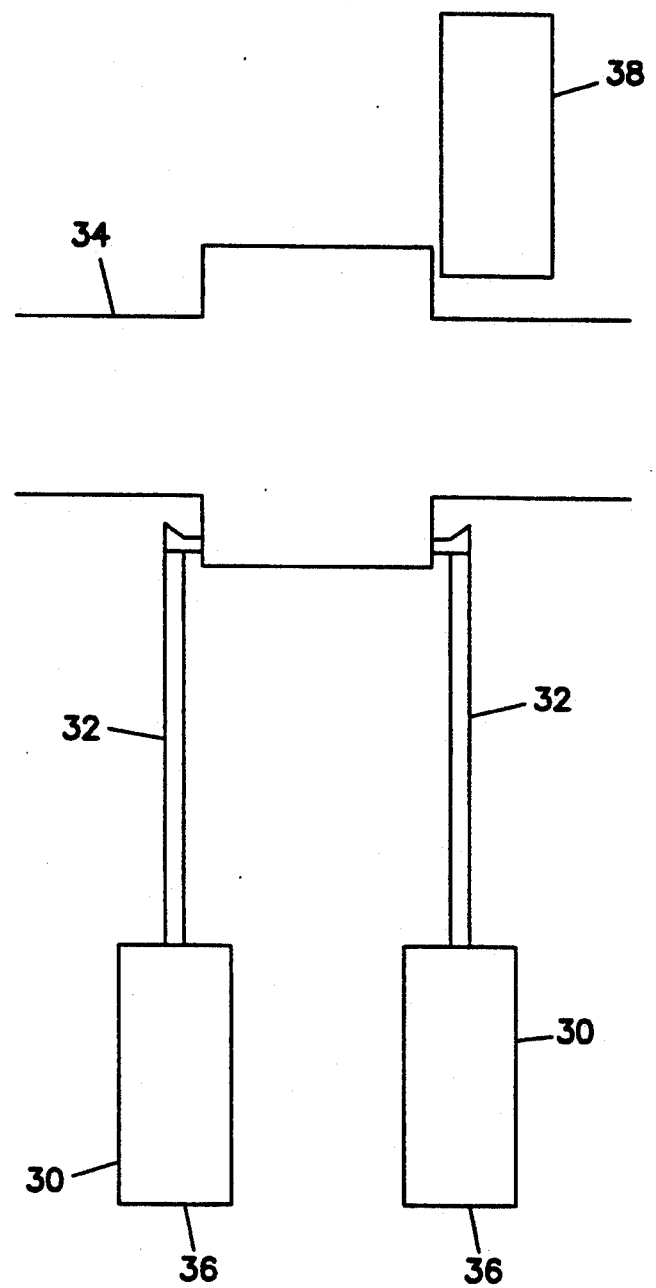
FIG. 2A depicts a plan view and FIG. 2B depicts a side view of a contact gaging system used in the preferred embodiment of the present invention.
Figure 2B:
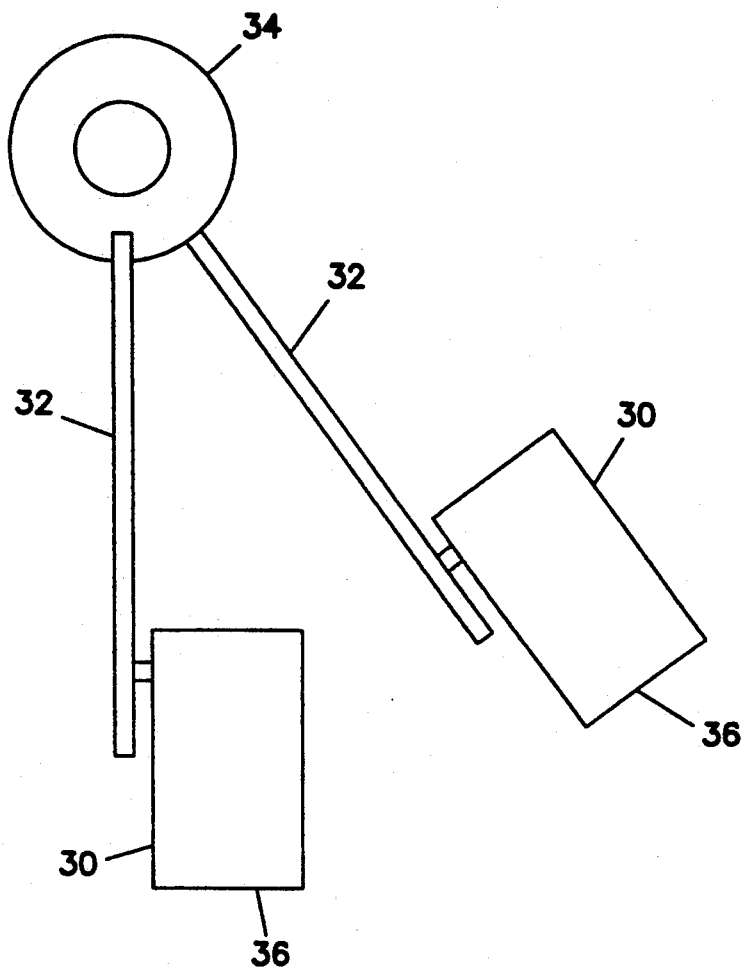

FIG. 2A depicts a plan view and FIG. 2B depicts a side view of a contact gaging system used in the preferred embodiment of the present invention, which is used in the grind console 20 to measures the land width or the gap between the edges of the lands. In the preferred embodiment, the contact gages 30 are Control Gaging, Inc. Model 30 Servo Spool Gages. However, those skilled in the art will be able to bring to mind other suitable expedients for the contact gages 30 without departing from the scope of the present invention.

The fingers 32 of the contact gages 30 are positioned on either side of a land or gap of a spool 34. Each exterior gaging finger 32 is attached to a shaft extending from the inside of a gage housing 36. A tension arm inside the housing 36 is attached to the shaft with a soft metal clutch, so that gaging finger 32 movement is transmitted through the shaft to the interior tension arm. The position of the finger 32 is converted to a proportional voltage by a linear variable displacement transducer (LVDT) within each gage housing 36. The LVDT has a primary coil and two secondary coils, and a displacement of a iron core alters the coupling between the primary coil and each secondary coil, increasing one and diminishing the other. The LVDT coil is attached to the housing 36 and the LVDT core is attached to the lower arm. Any relative movement between the tension arm and the housing 36 causes a corresponding movement of the core within the LVDT coil. When the interior tension arm moves, the LVDT produces a voltage across each secondary coil that is proportional to the position of the gaging finger 32.

The contact gages 30 connect to electronic amplifiers which power the LVDTs and process the output voltages to generate useful process information. The electronic amplifier outputs are summed, out-of-phase, so that the net signal is proportional to the land or gap width of the spool 34, with subsequent scaling and offsets. The measured value during grinding by the grinding wheel 38 moves from the desired removal amount towards zero, at which point the grinding operation is complete. The summed, out-of-phase measurement also provides a form of common mode rejection which eliminates, as part of the measurement, any simultaneous in-phase motion on both gages 30 or any expansion or contraction caused by temperature shifts.

GRIND CONSOLE DATA BASE CONTROL

Figure 3:
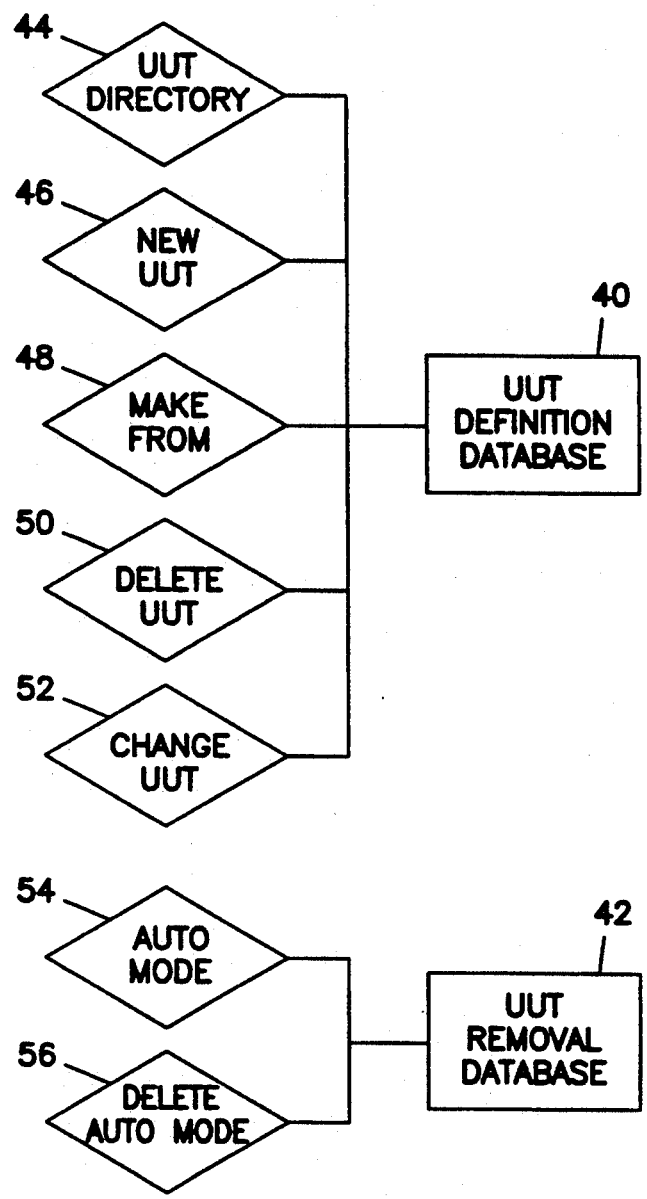
FIG. 3 depicts a flow diagram of process steps performed by the automatic flow grind system.

FIG. 3 depicts flow diagrams of database access methods in the grind console 10 portion of the automatic flow grind system of the present invention. These access methods manipulate two types of information in two databases 40 and 42 for UUT definitions and material removal data, respectively. The UUT definitions database 40 is organized by UUT name, and the material removal database 42 is organized by UUT name and UUT serial number. Both the UUT definitions database 40 and material removal database 42 are used by the grind console 20 to control the grinding operations for a particular spool and sleeve set. During execution, the grind console 20 monitors the grinding operation and provides status information for display to the operator.

At step 44, a "UUT directory" option allows the operator to display a list of UUT definitions in database

40. A UUT definition may be selected from the list for editing or viewing. The listing shows the UUT names and types (orientation of the first edge and number of edges). The display also includes the current page number and the total number of pages that comprise the listing. The operator may page up or page down to select previous and next pages, respectively. A UUT definition may be selected by positioning the cursor near the UUT name and pressing the enter key on a keyboard.

At step 46, a "New UUT" option allows new UUT definitions to be created by entering a name for the new UUT definition. The database 40 is searched for an existing record with the same name and rejects that name if that name is already in use. After an acceptable name is entered, a sub-menu is displayed allowing input for the orientation of the first edge and the number of metering edges.

At step 48, a "Make From" option allows a new UUT definition to be created by copying an existing UUT definition in database 40 and assigning a new name to it. The copied UUT definition may then be modified without having to reenter the unchanged parameters.

At step 50, a "Delete UUT" option deletes a UUT definition from the database 40.

At step 52, a "Change UUT" option allows the user to view or edit an existing UUT definition in the database 40.

At step 54, an "Automatic Mode Directory" option displays a list of UUTs which have material removal amounts specified for automatic mode operation. This data is stored in the database 42. Each entry in the automatic directory display includes the UUT name, serial number and percent of edge cut. The normal method of entering data into this database 42 is by direct transmission from the measurement console 10.

At step 56, a "Delete Automatic Mode Record" option may be used to delete an automatic mode record from the database 42.

SCREEN DISPLAYS

A UUT definition screen provides access to the UUT definition database 40, and an automatic mode screen provides access to the material removal database 42. The UUT definition screen and the automatic mode screen are similar in appearance. The UUT definition screen is used to specify nominal UUT dimensions, i.e., spool length, diameter, etc. The automatic mode screen, however, is used to specify how much material to remove from each edge. A user may toggle between the two screens with a simple key stroke.

Figure 4:
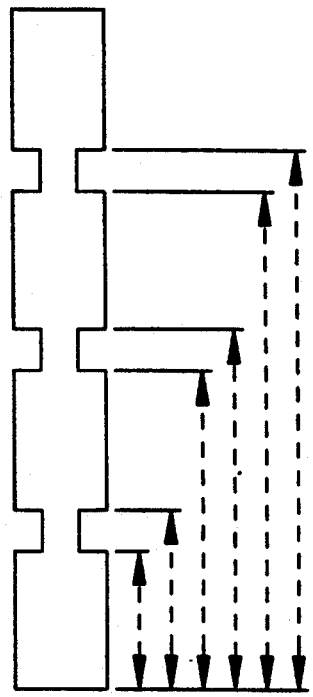
FIG. 4 depicts a first unit under test (UUT) definition screen.

FIG. 4 depicts first UUT definition screen. The UUT definitions are used to specify the nominal dimensions for a type of servo-valve spool. During grinding operations, nominal spool dimensions are used to position the grinding wheel near the spool's metering edges. The UUT definition screen includes the following fields: UUT Name, Spool Material Type, Measurement Units, Depth Of Grinding, Spool Grinding Rate, Nominal Spool Length, Nominal Land Diameter, Nominal Inner Diameter, and Nominal Edge Depth are displayed. The UUT Name field (or part number) represents a class of UUTs with the same nominal dimensions and material type, wherein the material removal data in database 42 is created accordingly whenever any new UUT serial number is transmitted or a regrind of the same serial number is transmitted. The Spool Material Type field is a data entry field in the UUT definition that is also displayed in the automatic mode screen. The Measurement Units field may be modified by selection via a sub-menu. The Depth Of Grind field specifies the depth of the grind as percentage of the nominal edge depth. The Spool Grind Rate field specifies the rotational speed of the spool during the edge cut. The Nominal Spool Length field specifies the length of the spool. The Nominal Land Diameter field specifies the outside diameter of the lands of the spool. The Nominal Inner Diameter field specifies the diameter of the opening in the spool reference end which is used to mount the spool in the console headstock assembly. The Nominal Edge Depth field specifies the depth of all metering edges of the spool. The remaining data entry fields define the distance from the reference end to the metering edge of the spool.

The data entered into the UUT definition screen is checked so that erroneous or impossible machining operations are not attempted. For example, if a spool length is entered that exceeds the maximum defined in the system configuration, an error message is displayed and the value is discarded. Checks are also performed before grinding operations are initiated. Therefore, if an erroneous value is left in the UUT definition, it would be detected before an attempt is made to grind the spool.

FIG. 5 depicts a second UUT definition screen. The Grind Spindle Rate field is used to specify the grinding wheel speed during the edge cut. The Measured Land Or Gap field is used to specify whether the gage fingers 32 of the contact gaging system 30 measure the gap between the lands or if they are to measure the lands. The Rotate To Grind Edge field indicates whether the spool needs to be rotated 180° in relation to the headstock/tailstock. If the land is too close to the head stock the spool would need to be rotated to grind the first two edges.

FIG. 6 depicts a third UUT definition screen. The feed rate of the grind wheel during cutting edge are entered in an Initial Feed Rate field, Intermediate Feed Rate field, and Final Feed Rate field. Depending upon the amount of material to be removed, the initial, intermediate and final feed rates may be changed. The initial feed rate is used for starting the edge cut. The intermediate feed rate activates at 250 millionth of an inch from the end of the cut, and the final feed rate activates for the last 100 millionth of an inch.

Figure 7:
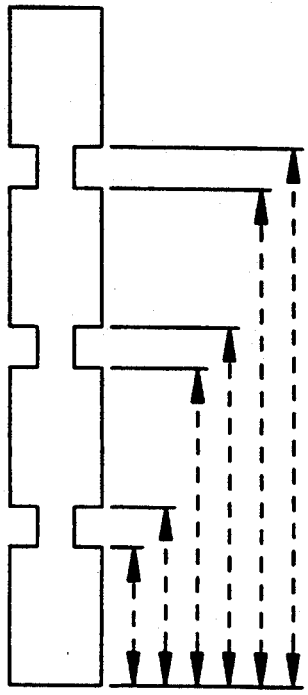
FIG. 7 depicts an automatic mode, material removal screen.

FIG. 7 depicts an automatic mode screen. In the automatic mode, the material removal portion of database 42 is used to specify how much material is to be removed from each metering edge of a specific servo-valve spool identified by UUT name and serial number. The automatic mode screen includes the following fields: UUT Name, UUT Serial Number, Operator ID, Percent To Grind, Percent Removed, Spool Material Type, Record Date/Time, Grind Date/Time, Performed By, and Amount To Remove From Each Edge. The UUT Name field represents a UUT part number, and this data entry field is used to select a different existing record from the database 42. The UUT Serial Number field, along with the UUT Name field, uniquely identifies the particular spool. The Operator ID field allows the operator of the grinding operation to be identified. The Percent To Grind field allows the user to specify what percentage of the specified removal amount for each edge is to be removed. The Percent Removed field identifies the cumulative total percent of material removed from the spool for a specific serial number. The Spool Material Type field identifies the spool material and is for reference only. The Record Time/Date field identifies the date and time that the data was recorded originally from the measurement console 10 (or was manually entered by the user), and is for reference only. The Grind Date/Time field identifies the time and date of the most recent grind operation performed on the UUT. The Performed By field identifies the operator who performed the last grind on this UUT. The Amount To Remove From Each Edge fields specify the total amount of material to be ground from each metering edge of the spool as determined by the measurement console 10. The units displayed are the same as the units selected on the UUT definition screen of FIG. 4. The labels, i.e., 1, 2, 3, etc., are consistent with the edge labels used on the UUT definition screen.

FIG. 8 depicts an automatic dressing cycle screen. The grind console 20 provides an automatic dressing cycle to simplify maintenance of the grinding wheel. Each time a UUT is ground, the grinding wheel statistics displayed on this screen are updated to help the user determine if the grinding wheel should be dressed. The automatic dressing cycle screen provides only one data entry field, namely Grinding Wheel ID. When an ID is entered into the field, the operator is queried whether the grinding statistics should be reset for a new grinding wheel. If the operator responds negatively, then the parameters remain unchanged. If the operator responds affirmatively, then the Date And Time Installed field and the Data And Time Last Dressed field are reset to zero, as are the Number Of Times Dressed field and all Usage fields.

FLOW-GAIN CALCULATIONS (MEASUREMENT CONSOLE)

In the present invention, flow and position data in the measurement console 10 and analyzed to find slopes and intercepts for all four lands of the spool under test. The intercept values are used to find a common reference position (average intercept) and to calculate removal amounts for each land of the spool. Moreover, slope values are used to evaluate the gain performance for acceptability, and leakage information is used to determine the fundamental acceptability of the servo-valve.

Figure 9:
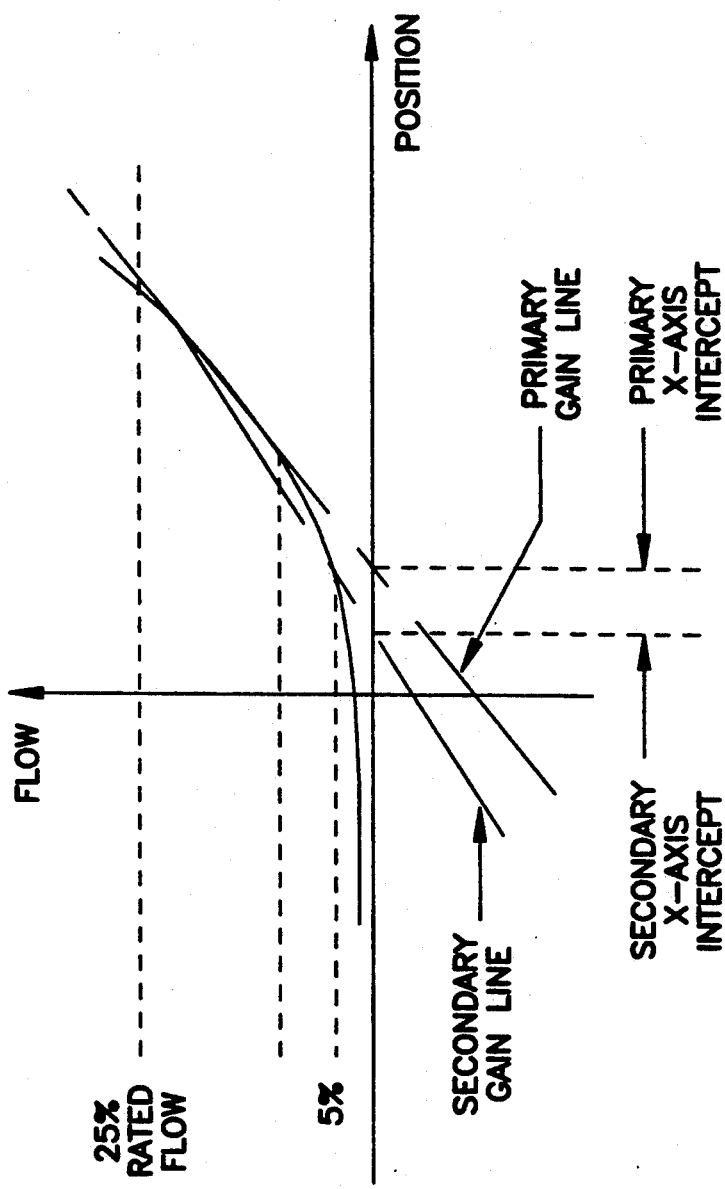
FIG. 9 is a graph of a typical single edge flow-gain characteristic for a servo-valve.

FIG. 9 is a graph of a typical flow-gain characteristic for a servo-valve. The primary gain and X-axis intercepts are determined for measurement data between approximately 10% and 25% of rated flow. Preferably, the gain and intercept values are determined by a linear regression analysis. The secondary gain and X-axis intercepts are also determined from measurement data between approximately 5% and 15% of rated flow The X-axis intercepts are emphasized, because linear regression traditionally yields Y-axis intercepts, and in the present invention, the X-axis intercept is the primary interest since it represents the apparent zero flow position for each edge of the servo-valve.

It is acceptable and desirable that the ranges of measurement for the primary and secondary calculations be part of the definition characteristics for each component (spool/sleeve type). The variances between gains and intercepts, primary to secondary, for a specific land provide a measure of quality for that land. An alternative to the variances would be some other analytical representation of the relative abruptness of an edge.

The null or reference position is the apparent X-axis intersection of all lands in a composite group analytically adjusted to a "zero-lap" condition. It is expressed in the same units and coordinate system as the individual land data. Any deviations in land-to-land primary and secondary gains provide an analytical measure of matched performance quality.

The actual rated flow is the average flow value for all lands in a composite at the rated stroke position. The actual rated stroke is the average position value for all lands in a composite corresponding to the measured rated flow. Either number or both is an acceptable output.

The average leakage value is the average value for all lands in a composite of the measured flow at the position represented by the primary X-axis intercept. The rationale for using this value is based on the assumption that the primary X-axis intercept represents the virtual zero flow position for a given land.

Neutral pressure is a finished spool characteristic and is equal to the control port pressure valve at the hydraulic null, i.e., the control port pressure valve at which both control port pressures are equal.

The composite lap condition is a measured result of a finished spool. It is defined as a difference in X-axis intercepts of the composite flow characteristics on either side of zero.

Figure 10:
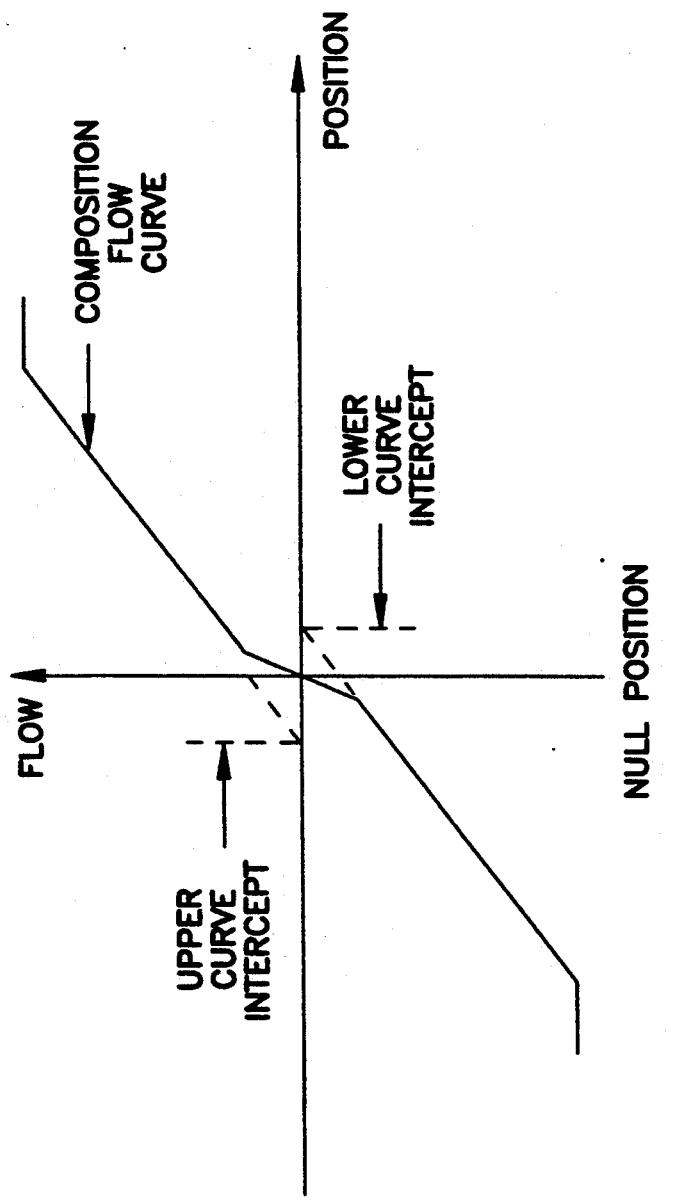
FIG. 10 is a graph of a flow-gain characteristic for an underlap condition.

FIG. 10 is a graph of a flow-gain characteristic for an underlap condition. An arbitrary definition of lap condition plurality is included in the definition of lap, namely, positive side intercept minus negative side intercept. Thus, the example in FIG. 10 has a negative lap condition or "underlap" since the positive side intercept is algebraically smaller than the negative side intercept. The opposite condition, "overlap", occurs when the positive side intercept is greater than the negative side intercept.

Lap condition is normally presented in units of % of rated, in this case, rated stroke. However, it would be acceptable to show the results in units of position.

It is critical to consider "flow versus position" data collection for individual lands. The relationship between lands is critical and a single land measurement is not problematical, but none of these devices function meaningfully in a single land fashion.

Figure 11:
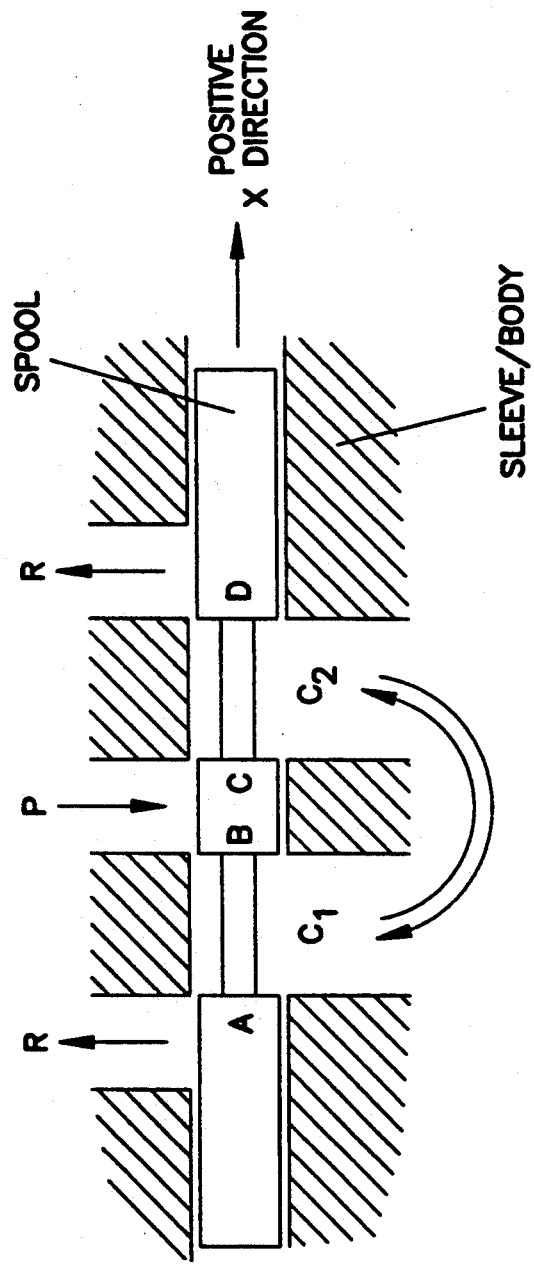
FIG. 11 depicts a four-way flow control configuration of an exemplary spool and sleeve of a servo-valve.

FIG. 11 depicts a four-way flow control configuration of an exemplary spool and sleeve of a servo-valve. The spool in FIG. 11 is shown in a null position with respect to the ports or slots in its companion sleeve. If this position is identified as zero, with positive motion to the right and negative motion to the left, then positive flow for the first pressure land (B) will occur with positive displacement to the right, i.e., flow from P to C1 across land B. Positive flow (P to C2) for the second pressure land (C) will occur with negative displacement. The negative flow (C1 to R) for the first return land (A) will occur with negative displacement. Negative flow (C2 to R) for the second return land (D) will occur with positive displacement.

When the spool-sleeve set is operating in composite, flow from P to C (land B) will flow into land D (C2 to R) and flow from P to C2 (land C) will flow into land A (C1 to R). From the previous assumption and analysis, it is clear that flows for like displacements (i.e, B plus, D minus) must be composite pairs.

It is customary and desirable to select a sequence of operation and display that correlates with the composite operation of the spool-sleeve set.

Figure 12:
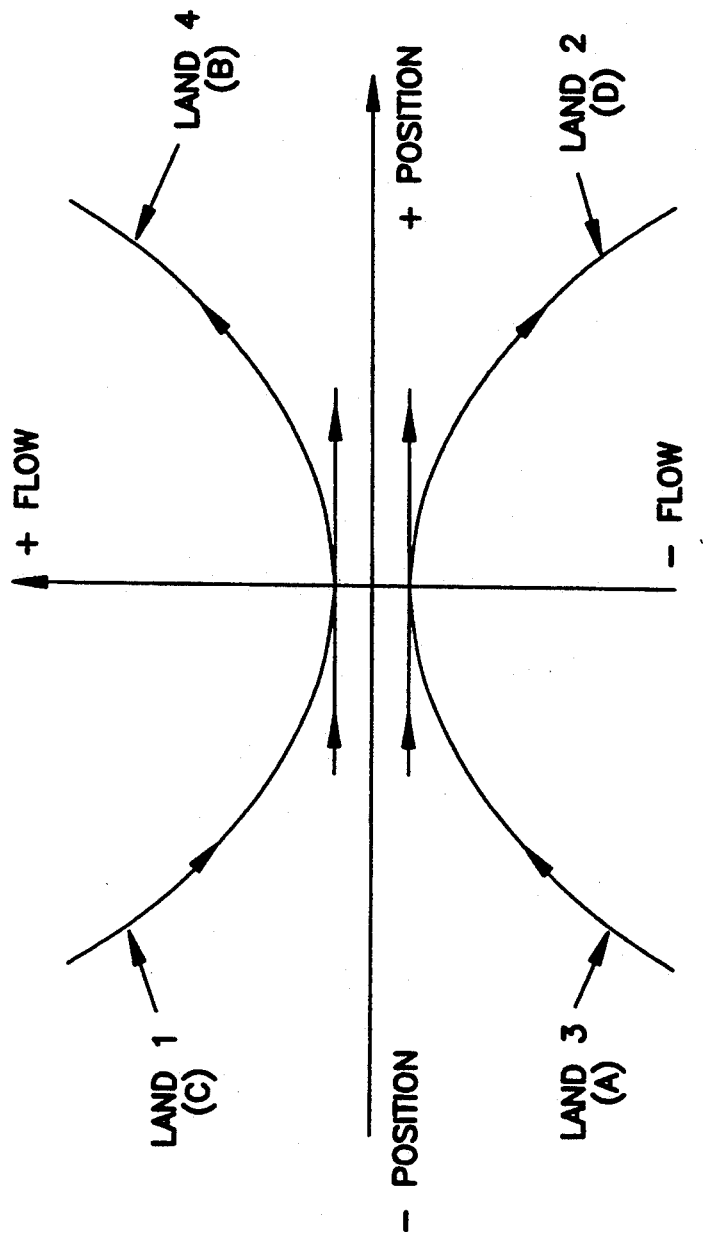
FIG. 12 depicts an exemplary four edge sequence of operation for a servo-valve, showing four individual edge flow-gain characteristics.

FIG. 12 depicts an exemplary four edge sequence of operation for a servo-valve, showing four individual edge flow gain characteristics. Sequence numbers are assigned, as opposed to the letter identifications previously used, to clearly distinguish between the sequence and simple identification. The first land to be measured is land 1, and for the example valve of the previous discussion, this is also land C (P to C2), but may not be for another valve. The next land in sequence, land 2, is negative flow for a positive position or land D (C2 to R). The next land in sequence, land 3, is negative flow for negative displacement or land A (C1 to R). Finally, land 4 is positive flow for positive displacement or land B (P to C1). In composite, lands 1 and 3 work together and lands 2 and 4 work together. It should be noted that three-way valves (single control port pressure or flow control) will normally be two land valves and in composite there is no flow from land to land, except perhaps at null in an underlapped design.

Figure 13:
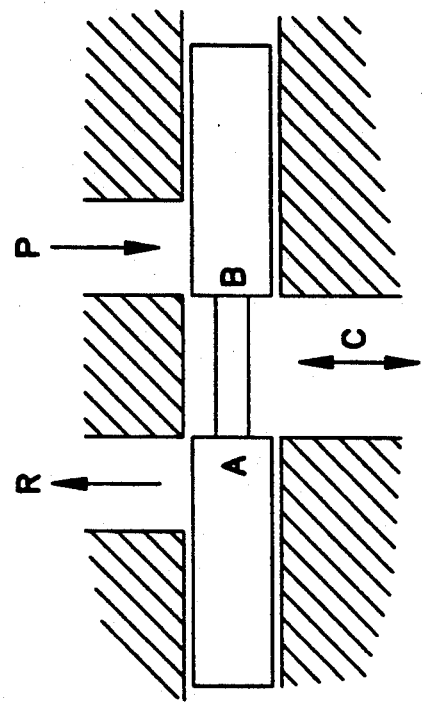
FIG. 13 depicts a three-way flow control configuration of an exemplary spool and sleeve of a servo valve.

FIG. 13 depicts a three-way flow control configuration of an exemplary spool and sleeve etc. Using the same flow polarity conventions as the four-way flow valve, positive flow is P to C, across land B, and negative flow is C to R, across land A. A sequence selection in this case adheres to the negative-negative, positive-positive coordinate convention, along with increasing to the right as a desired sequence.

Figure 14:
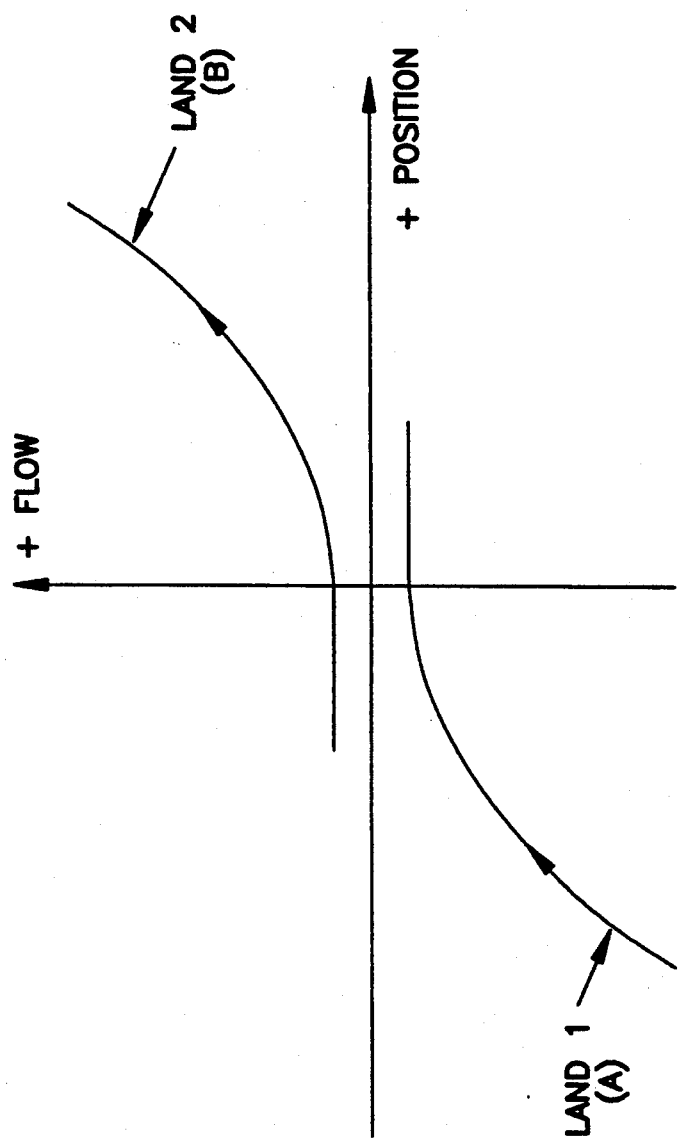
FIG. 14 illustrates the flow-gain characteristics for an exemplary two edge sequence of a three-way valve.

FIG. 14 depicts the flow gain characteristics for the two edge sequence of a three-way flow control valve. Land 1 is negative flow for negative displacement or land A (C1 to R). Land 2 is positive flow for positive displacement or land B (P to C1).

The "flow versus position" data collection for composite sets are intended for application to finished spool-sleeve sets, in order to prove the grinding process and to provide hard copy data for the results. Composite plots can be run on unfinished sets, but the results would only be useful for investigative purposes.

Normally included (almost automatically included) with the composite flow gain is the neutral pressure. If the data collection is performed in a similar fashion to the individual lands, then very nearly the first step is to find hydraulic null. The cylinder port pressures which are equal at hydraulic null represent neutral pressure by definition.

The remainder of the data collection is very much like a normal servo-valve flow gain collection. The "flow versus position" data is collected over the range of negative rated flow to positive rated flow and back to negative rated flow. If this is the only range offered, then the resolution and the number of points in the collection must be sufficient to confirm the results of the grind.

Obviously, the individual land sequences can be run as well, in order to confirm the grind in exactly the same scale as the original pre-grind testing.

Two land composites require special hydraulic conditions at the control port. Specifically, the control port pressure should be maintained at one-half the supply pressure either with a pressure control valve or with a 2:1 area flow metering cylinder.

Eight land composites must include a reliable method for confirming set synchronism, in addition to confirmation of the grind with each set.

For material removal analysis, the number of samples for each land should be sufficient to insure good statistical performance of the linear regression analysis. Certainly, no fewer than 100 samples each, of flow and position, should be taken. In the preferred embodiment, the sample step size is 0.1% of the rated flow or rated stroke per sample. If the collection, for example, is $-15\%$ of the rated stroke to $+25\%$ of the rated stroke, then the number of data points would be 400 $(15+25/0.1)$.

Also, in the preferred embodiment, allowance is made for programmed lap condition, i.e., over or under.

The present invention provides, in memory, four sets of data, each of size N, wherein each set comprises N point pairs, position as excitation or X-axis coordinate, and flow as response or Y-axis coordinate. In the following example, the range of position for an edge whose flow increases with increasing X is assumed to be from (null $-15\%$ rated stroke) to (null $+25\%$ rated stroke), and, for an edge whose flow increases with decreasing X, a range of ( null $+15\%$ rated stroke) to (null $-25\%$ rated stroke).

To find the primary gains and intercept for each land, a linear regression analysis is performed on the data beginning with (null $\pm 5\%$ rated stroke) and ending with (null $\pm 25\%$ rated stroke), i.e., for $i=N/2$ to N, or $i=0$ to $N/2$. This process yields slopes P1 and X-axis intercepts $XP_j$, where j is the land index and $j=1, 2, 3, 4$.

To find the secondary gains and intercepts for each land, a linear regression analysis is performed on the data beginning with (null $\pm 5\%$ rated stroke) and ending with (null $\pm 15\%$ rated stroke), i.e., for $i=N/2$ to $\frac{3}{4}$ (N), or $i=\frac{3}{8}$ (N) to N/2. This method yields slopes $S_j$ and X-axis intercepts $XS_j$.

Using the $XP_j$ values, the corresponding flow value (leakage flow) is found for each value of j, by scanning the flow data and position data simultaneously beginning at (null $\pm 15\%$ rated stroke) and comparing each position value with $XP_j$. When the position value becomes larger than $XP_j$, the scanning is stopped and the simultaneously scanned flow value is used as $QL_j$, which is the leakage flow or flow at the X-axis intercept.

The gain and intercept variances for each land are found by:

$$GVAR_j = P_j - S_j \ (j=1,2,3,4)$$

$$IVAR_j = XP_j - XS_j \ (j=1,2,3,4)$$

The variances are judged for acceptability by comparing these values with normal values determined from empirical data. The final limit values are included in part number definition tables.

The null reference position is determined by:

$$XREF = \frac{1}{4} \sum_{j=1}^{4} XP_j$$

which is simply the average value of 4 XP's.

Figure 15:
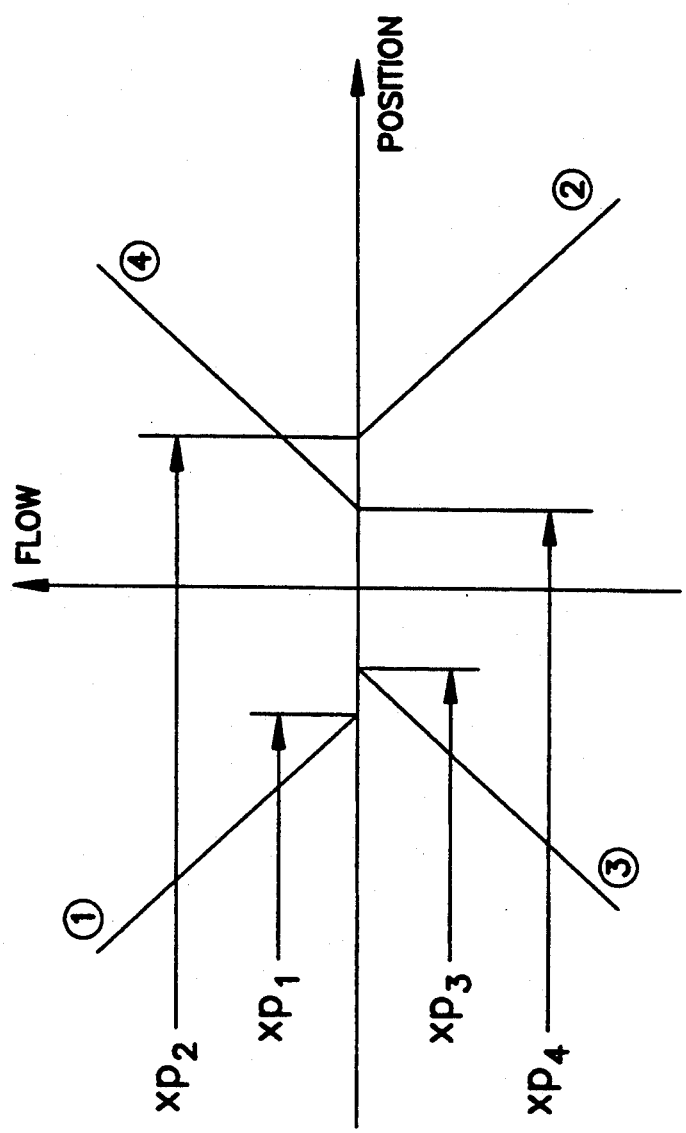
FIG. 15 illustrates an exemplary set of intercept locations for a four-way flow control valve.

In an alternative approach, the inside pair of intercepts are selected and averaged as depicted in FIG. 15. The inside pair as depicted in FIG. 15 would be 3 and 4. Algebraically, this would be represented by:

$$XREF = (Min[XP_2, XP_4] + Max[XP_1, XP_3])/2$$

This method insures that at least two of the lands have minimum material removal.

The possibility also exists with the average value technique for the existence of an average value which is less than one of the edges, yielding an impossible removal. The recommended method ensures that XREF is always compatible with removal from all four edges.

A method for presenting land-to-land deviations is by plotting. The deviation (Y-axis) is defined as the actual flow value minus the ideal flow value or $(Q_i - QR_i)j$. The ideal value is the flow calculated from the primary slopes $P_j$ and the primary Y— intercepts $QP_j$ wherein:

$$QR_{ij} = P_j X_{ij} + QP_j \, (Y = MX + b)$$

The Y intercept is automatically yielded by previous linear regression calculations. This plot technique provides four (or two) plots revealing each individual land conformity compared to its own primary slope. Those skilled in the art will readily recognize other presentations for plotting might also be useful.

Numeric expression of the deviations can be depicted:

$$PGDEV_J = P_J - PA, \text{ where } PA = \tfrac{1}{4} \sum_{j+1}^{4} P_j$$

$$SGDEV_J = S_J - SA, \text{ where } SA = \tfrac{1}{4} \sum_{j+1}^{4} S_j$$

The proper evaluation of the these results is based upon empirical data.

The actual rated flow is determined by:

$$AQR = XR \left( \sum_{j=1}^{4} P_j \right) / 4$$

and the average value of the four primary slopes (PA) times the rated stroke. The actual rated stroke is:

$$AXR = QR/(PA)$$

The actual removal amounts are calculated as follows:

$$CUT_1 = XREF - XP_1 - OV_j$$

$$CUT_2 = XP_2 - XREF - OV_j$$

$$CUT_3 = XREF - XP_3 - OV_j$$

$$CUT_4 = XP_4 - XREF - OV_j$$

The $OV_j$ values are desired overlap values which are obtained from the part definition tables in the database 40. Positive values for OV represent overlap (they reduce the cut value), while negative values representing underlap (they increase the cut value). It is acceptable to define the lap conditions for each land, although it is more conventional to specify only two values, i.e., one for the return lands and one for the supply lands. In the preferred embodiment, four distinct values are preferable for maximum generality.

Figure 16:
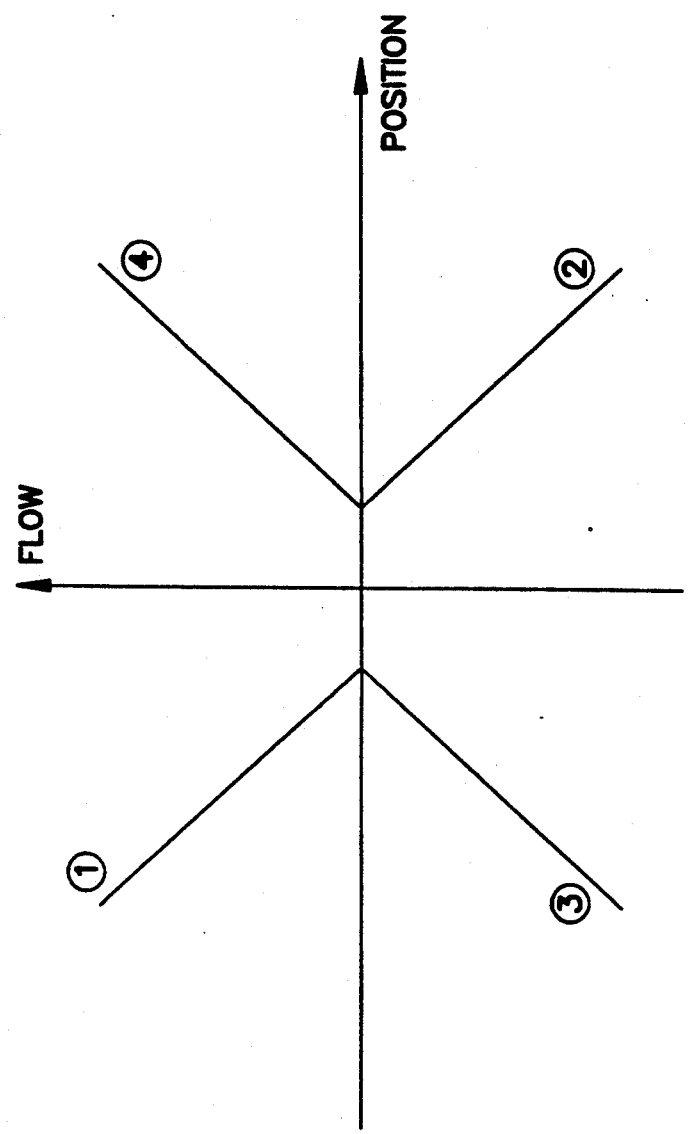
FIG. 16 illustrates the flow-gain intercept characteristics of an overlapped normal valve with equal pressure and return lap conditions.

As an example, reference is now made to FIG. 16 in conjunction with the following description. Consider the characteristic of a slightly overlapped normal valve (individual lands not in composite). As X increases from full left toward the right, the flow from 1 to 3 gradually decreases to shutoff, all flow is off (except for leakage) during the overlapped range, and then flow from 4 to 2 gradually increases.

Figure 17:
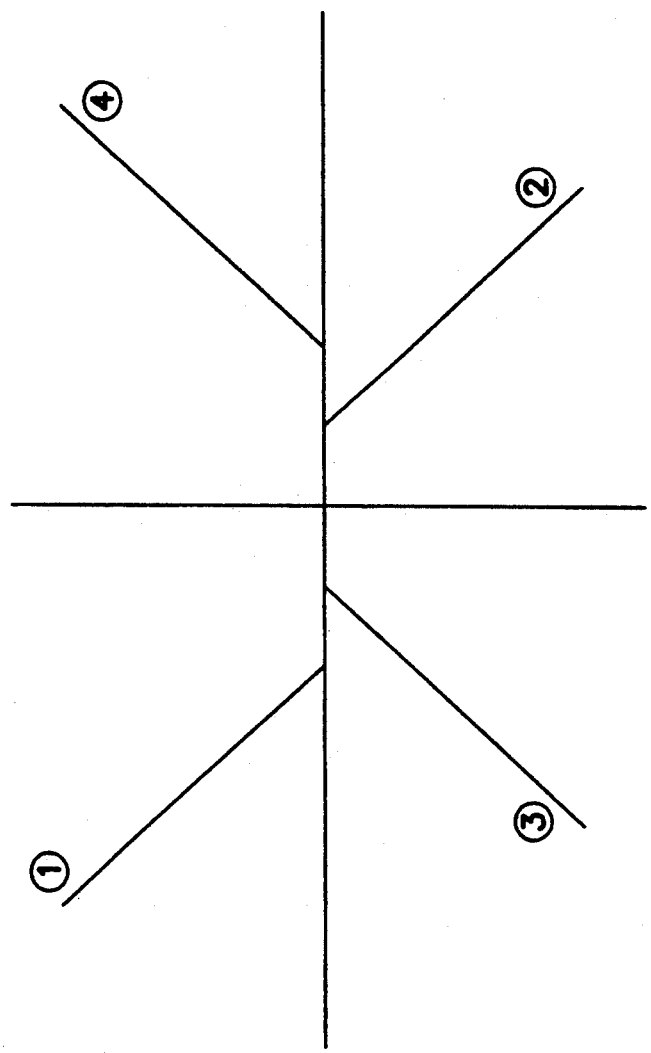
FIG. 17 illustrates the flow-gain intercept characteristics of an overlapped normal valve with unequal (pressure greater than return) pressure and return lap conditions.

If the characteristics were, instead, as illustrated in FIG. 17, then land 1 approaches shutoff and land 3 continues to flow, and thereby does nothing except to dump port C1 to return. As motion continues to the right, the land 3 becomes fully shut off and land 2 begins to connect C2 to return, and shortly thereafter land 4 begins to flow (P to C1). This may be of utility in the dead zone, wherein the control port pressures are actually reduced to minimum before powered operation resumes.

The whole process described above yields values for the removal of material from edge or land with respect to that edge. In other words, there is no absolute coordinate reference. In the grind process, each edge is located by some automatic method, and the grind measurement begins using the found edge as reference. Any method suggesting the transfer of absolute coordinates or coordinate system translation could be judged as technically deficient, since such a method would grossly and unnecessarily complicate the grind.

The flow measurement technique is relatively easy to evaluate. However, there must be evidence of understanding the accuracy techniques, particularly at the low end where the leakage and secondary slope data are taken. Because of their unique capability to measure flow continuously through zero without losing signal, flow metering cylinders are recommended. Other techniques, of course, can be utilized without departing from the spirit of the present invention. Turbine flow meters must include a clearly defined technique to ensure that the low and high end nonlinearities are correctable in order to meet the accuracy requirements. A scheme suggesting flow meter range switching during a data collection run would most likely be unacceptable. Hydraulic motor-type flow meters have significant differential pressure variations as a function of flow, so any technique which offered such meters must include a clearly defined pressure compensation technique as well as a nonlinearity correction at the low end.

Whatever flowmeter is used, there must be a very solid, well defined, calibration verification technique. If flow metering cylinders are used, access to the inherent capability for self-calibration must be offered, i.e., the capability to measure flow and time simultaneously, followed by accurate full stroke integration, must be included.

Physical, end-to-end calibration correlation capability must be offered for all flow meters. This is the capability to observe system measured flow simultaneously with the induced flow of an internal flow standard. The built-in automatic capability to use correlation flow runs for calibration correction is also highly desired. Each flow condition established by an external standard can be automatically stored as data for that transducer, thereby creating a flow correction table based on a transfer standard, or a primary standard if available. It should be noted that the Bureau of Standards recognize any properly measured mechanically and instrumented positive displacement cylinder as a primary standard. Pressure control, both supply and return, are as critical as flow. In fact, the supply and return pressure stabilities must be specified. Significant pressure fluctuations, particularly in the critical areas of ±5% to 10% of rated flow, can render a data collection run useless.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An automated system for machining servo-valves, comprising:
   (a) a computer-controlled measurement console, comprising means for testing a particular servo-valve comprising a spool and sleeve set using automatic flow, pressure, and displacement measurements, means for generating data for use in flow-gain and removal calculations to determine flow and pressure gain performance characteristics for the servo-valve, means for performing the flow-gain and removal calculations, and means for storing results thereof in a memory corresponding to a unique identifier for the spool and sleeve set; and
   (b) a computer-controlled grind console, coupled to the computer-controlled measurement console, comprising means for machining the particular servo-valve according to the results of the flow-gain and removal calculations, further comprising contact gaging means for measuring a land width and a gap between the land edges of the spool, and means for precisely grinding the spool's land edges so as to exactly match these edges with the sleeve slots to meet overlap/underlap requirements and performance requirements of the servo-valve, wherein the results of the flow-gain and removal calculations, the overlap/underlap requirements, and the performance requirements of the servo-valve are stored in a memory corresponding to the unique identifier for the spool and sleeve set.

2. The system of claim 1, wherein the computer-controlled measurement console further comprises means for hydraulically measuring a relationship between metering edges of the spool and the slots in the sleeve.

3. The system of claim 1, wherein the measurement console further comprises means for testing the spool and sleeve set by applying hydraulic flow and pressure as the spool is being controlled by a linear actuator, so that flows and pressures are accurately measured and recorded by the computer.

4. The system of claim 1, wherein the means for performing the flow-gain and removal calculations further comprise means for performing multiple-land flow-gain and edge removal calculations on the spool and sleeve set.

5. The system of claim 1, wherein the means for performing the flow-gain and removal calculations further comprise means for calculating how much material must be ground from each metering edge to produce a desired mechanical synchronization for the servo-valve.

6. The system of claim 1, wherein the means for performing the flow-gain and removal calculations further comprises means for analyzing flow and position data to find slopes and intercepts for all lands of the spool.

7. The system of claim 6, wherein the means for analyzing further comprises means for using intercept values to find an average intercept as a common reference position.

8. The system of claim 6, wherein the means for analyzing further comprises means for using slope values to evaluate the gain performance for acceptability.

9. The system of claim 6, wherein the means for analyzing further comprises means for using leakage information to determine a fundamental acceptability of the servo-valve.

10. The system of claim 1, wherein the means for precisely grinding comprises means for proceeding to each edge of the spool in sequence and means for removing a prescribed amount of material from each edge of the spool according to the removal calculations performed by the measurement console.

11. The system of claim 1, wherein the grind console further comprises a unit under test (UUT) definitions database organized by UUT name, and a material removal database organized by UUT name and UUT serial number, wherein the UUT definitions database and the material removal database are used by the grind console to control the grinding operations for the spool and sleeve set.

12. The system of claim 11, wherein a UUT definition screen provides access to the UUT definition database, and an automatic mode screen provides access to the material removal database.

13. The system of claim 12, wherein the UUT definition screen is used to specify nominal UUT dimensions.

14. The system of claim 12, wherein the automatic mode screen is used to specify how much material to remove from each edge of the spool.

* * * * *

UNITED STATES PATENT AND TRADEMARK OFFICE
CERTIFICATE OF CORRECTION

PATENT NO. : 5,333,112
DATED : July 26, 1994
INVENTOR(S) : Jimmy L. Bybee It is certified that error appears in the above-identified patent and that said Letters Patent is hereby corrected as shown below:

Column 10, line 22, "P1" should read --$P_j$--.

Signed and Sealed this

Eighteenth Day of October, 1994

Attest:

BRUCE LEHMAN

Attesting Officer    Commissioner of Patents and Trademarks